US012655303B2

(12) United States Patent
Zee et al.

(10) Patent No.: US 12,655,303 B2
(45) Date of Patent: Jun. 16, 2026

(54) ADHESION PROMOTER FOR COMPOSITES AND METHODS THEREOF

(71) Applicants: The Boeing Company, Arlington, VA (US); Commonwealth Scientific and Industrial Research Organisation, Act (AU)

(72) Inventors: Malia Zee, St. Louis, MO (US); Angela Christine Faith Davis, Maryland Heights, MO (US); Karen Ann Schultz, Seattle, WA (US); Kay Youngdahl Blohowiak, Issaquah, WA (US); Jill Elisabeth Seebergh, Seattle, WA (US); Eric Alan Bruton, Lake Saint Louis, MO (US); Weidong Yang, Clayton (AU); Sheng Li, Melbourne (AU); Ranya Simons, Melbourne (AU); Nick Rigopoulos, Brighton (AU)

(73) Assignees: THE BOEING COMPANY, Arlington, VA (US); COMMONWEALTH SCIENTIFIC AND INDUSTRIAL RESEARCH ORGANISATION, Act (AU)

( * ) Notice: Subject to any disclaimer, the term of this patent is extended or adjusted under 35 U.S.C. 154(b) by 348 days.

(21) Appl. No.: 18/333,825

(22) Filed: Jun. 13, 2023

(65) Prior Publication Data

US 2024/0417568 A1 Dec. 19, 2024

(51) Int. Cl.
*C09D 5/00* (2006.01)
*C09D 7/20* (2018.01)
(Continued)

(52) U.S. Cl.
CPC ............... *C09D 5/002* (2013.01); *C09D 7/20* (2018.01); *C09D 7/61* (2018.01); *C09D 7/63* (2018.01);
(Continued)

(58) Field of Classification Search
CPC . C09D 5/002; C09D 7/61; C09D 7/20; C09D 7/63; C09D 183/08; C09J 5/02; C09J 5/06; C09J 5/10; C09J 2301/504
(Continued)

(56) References Cited

U.S. PATENT DOCUMENTS 3,833,405 A 9/1974 Lee et al.
4,252,885 A * 2/1981 McGrail .................. G03C 1/93
430/533
(Continued)

FOREIGN PATENT DOCUMENTS

CN 107325780 A 11/2017
CN 112961357 A 1/2022
(Continued)

OTHER PUBLICATIONS

Chaijareenont et al., "Effects of different sulfuric acid etching concentrations on PEEK surface bonding to resin composite," Dental Materials Journal 2018; 37(3): 385-392.
(Continued)

*Primary Examiner* — James E McDonough
(74) *Attorney, Agent, or Firm* — MH2 Technology Law Group LLP

(57) ABSTRACT

An adhesion promoter composition is including one or more reactive silanes, one or more swelling agents, and one or more organic solvents, where the one or more reactive silanes forms a complex with the one or more swelling agents is disclosed. The one or more reactive silanes may include an amine functional group, an epoxy functional
(Continued)

group, a mercapto functional group, an isocyanate functional group, or a combination thereof. The one or more swelling agents is selected from a group which may include phenol or naphthol derivatives. A composite part including the adhesion promoter composition and a method for applying the adhesion promoter composition is also disclosed.

21 Claims, 4 Drawing Sheets

(51) Int. Cl.

| | |
|---|---|
| *C09D 7/40* | (2018.01) |
| *C09D 7/61* | (2018.01) |
| *C09D 7/63* | (2018.01) |
| *C09D 183/08* | (2006.01) |
| *C09J 5/02* | (2006.01) |
| *C09J 5/06* | (2006.01) |
| *C09J 5/10* | (2006.01) |

(52) U.S. Cl.
CPC ............. *C09D 7/70* (2018.01); *C09D 183/08* (2013.01); *C09J 5/02* (2013.01); *C09J 5/06* (2013.01); *C09J 5/10* (2013.01); *C09J 2301/504* (2020.08)

(58) Field of Classification Search
USPC ...................................................... 106/287.1
See application file for complete search history.

(56) References Cited

U.S. PATENT DOCUMENTS

| | | | | |
|---|---|---|---|---|
| 5,212,017 | A * | 5/1993 | Meder ...................... | C09D 4/00 |
| | | | | 427/322 |
| 5,384,192 | A | 1/1995 | Long et al. | |
| 7,893,133 | B2 | 2/2011 | Jeong et al. | |
| 2010/0310862 | A1 | 12/2010 | Efraty | |
| 2012/0322954 | A1 | 12/2012 | Zupancich et al. | |
| 2021/0230457 | A1 | 7/2021 | Liu et al. | |
| 2022/0306897 | A1 | 9/2022 | Bui et al. | |

FOREIGN PATENT DOCUMENTS

| | | | | | |
|---|---|---|---|---|---|
| FR | 2000975 | A1 | 9/1969 | | |
| JP | 2011210917 | A | 10/2011 | | |
| KR | 102427140 | B1 * | 8/2022 | ........... | C09D 163/00 |
| WO | 2010100410 | A1 | 9/2010 | | |

OTHER PUBLICATIONS

Henneuse-Boxus et al., "Surface functionalization of PEEK films using photochemical routes," European Polymer Journal 37 (2001) 9-18.

Hetemi et al., "Surface functionalisation of polymers," Chem. Soc. Rev., 2017, 46, 5701.

Kassick et al., "Osteoconductive Enhancement of Polyether Ether Ketone: A Mild Covalent Surface Modification Approach," ACS Appl. Bio Mater. 2017, 1, 1047-1055.

Kim et al., "Long-term stable hydrophilic surface modification of poly(ether ether ketone) via the multilayered chemical grafting method," J. Appl. Polym. Sci. 2017, DOI: 10.1002/App. 46042.

Manolakis et al., "Direct Iminization of PEEK," Macromolecules, 2011, 44, 7864-7867.

Moloney, "Functionalized polymers by chemical surface modification," J. Phys. D: Appl. Phys. 41 (2008) 174006 (9pp).

Schmidlin et al., "Effect of different surface pre-treatments and luting materials on shear bond strength to PEEK," ScienceDirect, Dental Materials, 26 (2010) 553-559.

Silthampitag et al., "Effect of surface pretreatments on resin composite bonding to PEEK," Dental Materials Journal 2016; 35(4): 668-674.

Sproesser et al., "Effect of sulfuric acid etching of polyetheretherketone on the shear bond strength to resin cements," The Journal of Adhesive Dentistry, vol. 16, No. 5 (2014) 465-472.

Thompson et al., "A novel method for crosslinking polyetheretherketone," Journal of Applied Polymer Science, vol. 36 (1933) 1113-1120/.

Yousaf et al., UV-light assisted single step route to functional PEEK surfaces, Reactive & Functional Polymers, 83 (2014) 70-75.

Zheng et al., "Enhanced osteogenic activity of phosphorylated polyetheretherketone via surface-initiated grafting polymerization of vinylphosphonic acid," Colloids and Surfaces B: Biointerfaces, 173 (2019) 591-598.

Zhou et al., "The effect of different surface treatments on thebond strength of PEEK composite materials," Dental Materials, 30 (2014), e209-e215.

Extended European Search Report issued Nov. 11, 2024 in corresponding EP Application No. 24177900.8, 6 pages.

* cited by examiner

FIG. 2

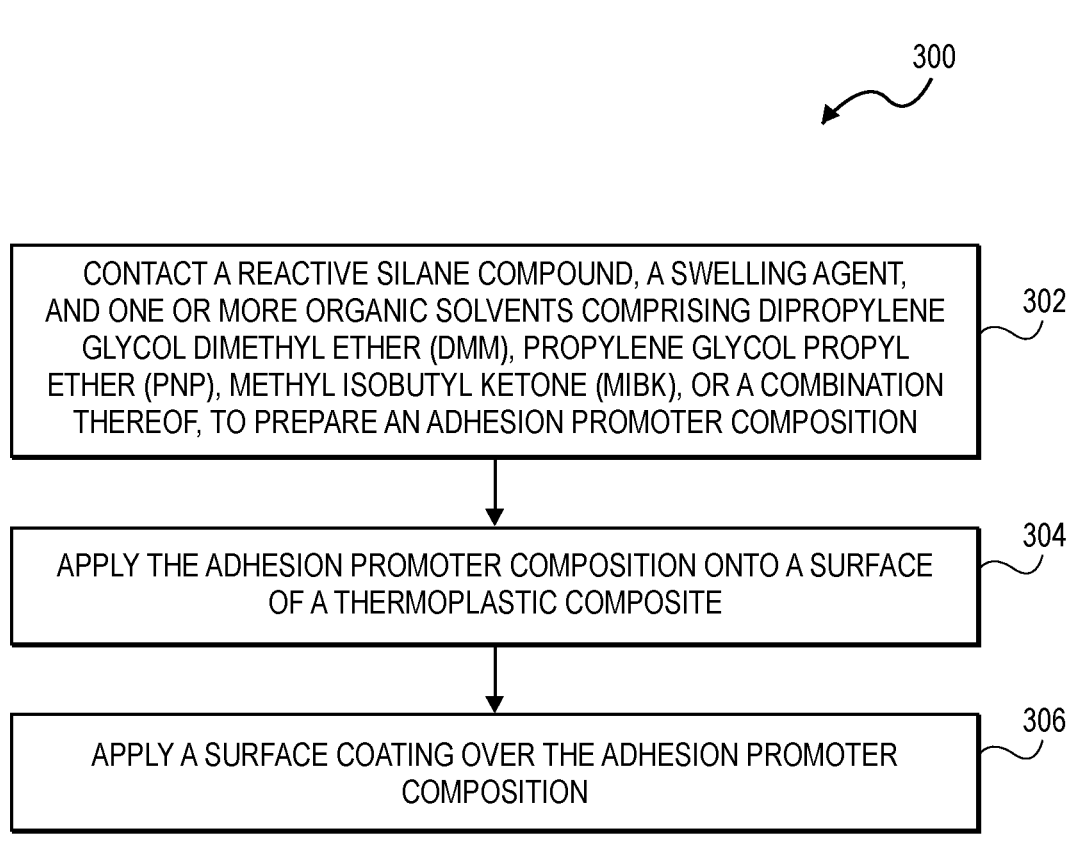

300

CONTACT A REACTIVE SILANE COMPOUND, A SWELLING AGENT, AND ONE OR MORE ORGANIC SOLVENTS COMPRISING DIPROPYLENE GLYCOL DIMETHYL ETHER (DMM), PROPYLENE GLYCOL PROPYL ETHER (PNP), METHYL ISOBUTYL KETONE (MIBK), OR A COMBINATION THEREOF, TO PREPARE AN ADHESION PROMOTER COMPOSITION          302

APPLY THE ADHESION PROMOTER COMPOSITION ONTO A SURFACE OF A THERMOPLASTIC COMPOSITE          304

APPLY A SURFACE COATING OVER THE ADHESION PROMOTER COMPOSITION          306

FIG. 3

ADHESION PROMOTER FOR COMPOSITES AND METHODS THEREOF

TECHNICAL FIELD

The present teachings relate generally to adhesion promoters and, more particularly, to adhesion promoters for composite materials and methods for preparing same.

BACKGROUND

Polyaryletherketone (PAEK) thermoplastic composites have bulk properties that are desirable in several applications in the aerospace and other industries. These PAEK composites have poor compatibility with currently qualified aerospace finishes that have been developed originally for metals and thermoset substrate materials. Finishes, sealants, and surface coatings play a vital role in the successful assembly of various aircraft components and see widespread use in both manufacturing and maintenance.

Unfortunately, coatings, sealants, and adhesives that provide acceptable adhesion with thermosets are unable to meet the same adhesion requirements when applied to polyaryletherketone (PAEK), polyetherketoneketone (PEKK), polyetheretherketone (PEEK), and other thermoplastic or thermoplastic composite materials after surface preparation by sanding. Although acceptable adhesion of these finishes on thermoplastics may be achieved using surface preparation methods other than sanding, sanding is the most practical surface preparation technique in repair and rework scenarios.

There is an interest in developing a chemical treatment that would be effective and practical in achieving sufficient adhesion, alone or in combination with other surface preparation methods for aerospace composite materials such as, but not limited to sanding.

SUMMARY

The following presents a simplified summary in order to provide a basic understanding of some aspects of one or more examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

An adhesion promoter composition is disclosed. The adhesion promoter composition includes one or more reactive silanes, one or more swelling agents, and one or more organic solvents, where the one or more reactive silanes forms a complex with the one or more swelling agents. Implementations of the adhesion promoter composition include where the one or more reactive silanes forms the complex through interactions such as hydrogen bonding and/or ionic bonding with the one or more swelling agents. A molar ratio of the one or more reactive silanes to the one or more swelling agents functional groups is from about 0.1:1 to about 1.5:1. The one or more reactive silanes may include an amine functional group, an epoxy functional group, a mercapto functional group, an isocyanate functional group, or a combination thereof. The one or more reactive silanes may include a multialkoxy silane. The one or more reactive silanes may include a bis-trimethoxysilane, a bis-triethoxysilane, a tris-trimethoxysilane, a tris-triethoxysilane, or a combination thereof. The one or more reactive silanes is selected from a group including 3-aminopropyltrimethoxysilane (APTMS), 3-aminopropyltriethoxysilane (APS), 3-aminopropylmethyldimethoxysilane (APMDMS), 3-aminopropylmethyldiethoxysilane (APMDES), 3-aminopropyldimethylethoxysilane (APDMES), 3-(2-aminoethylamino)propyltrimethoxysilane (AEPTMS), 3-(2-aminoethylamino)propyltriethoxysilane (AEPTES), 3-(2-aminoethylamino)propyldimethoxymethylsilane (AEDMMS), 3-(2-aminoethylamino)propyldiethoxymethylsilane (AEDMES), 3-[2-(2-aminoethylamino)ethylamino]propyltrimethoxysilane (TMSDETA), and 3-[2-(2-aminoethylamino)ethylamino]propyltriethoxysilane (TESDETA). The one or more reactive silanes is selected from a group that may include bis[3-(trimethoxysilyl)propyl]amine (BTMSPA), 1,2-bis(trimethoxysilyl)ethane (BTMSE). 1,8-bis(trimethoxysilyl)octane (BTMSO), tris[3-(trimethoxysilyl)propyl]isocyanurate (TMSIC), 1,2-bis(triethoxysilyl) ethane (BTESE), 1,8-bis(triethoxysilyl)octane (BTESO), and bis[3-(triethoxysilyl)propyl]tetrasulfide (BTSTS). The other functional group silane may include (3-glycidyloxypropyl)trimethoxysilane (GPTMS), (3-glycidyloxypropyl) triethoxysilane (GPTES), [2-(3,4-epoxycyclohexyl)ethyl] trimethoxysilane (ectms), [2-(3,4-epoxycyclohexyl)ethyl] triethoxysilane (ECTES), (3-mercaptopropyl) trimethoxysilane (MPTMS), (3-mercaptopropyl) triethoxysilane (MPTES), 3-(trimethoxysilyl)propyl isocyanate (TMSPI) and 3-(triethoxysilyl)propyl isocyanate (TESPI), or a combination thereof. The one or more reactive silanes is present in the adhesion promoter composition in an amount of from 1 wt % to 10 wt % based on a total weight of the adhesion promoter composition. The one or more swelling agents is present in the adhesion promoter composition in an amount of from 1 wt % to 10 wt % based on a total weight of the adhesion promoter composition. The one or more swelling agents is selected from a group including phenol or naphthol derivatives, especially chloro substituted phenol or naphthol derivatives, such as 2-chlorophenol (2CPO), 3-chlorophenol (3CPO), 4-chlorophenol (CPhO), 2-amino-4-chlorophenol (ACPO), 2-allyl-4-chlorophenol (ALCPO), 2-benzyl-4-chlorophenol (BCPO), 2-methoxy-4-chlorophenol (MCPO), 4-chloro-1-naphthol (CNO), 2-chloro-1-naphthol (2CNO), 1-chloro-2-naphthol (C2NO), 2,4-dichloro-1-naphthol (DCNO), 2-allyl-4-chloro-1-naphthol (ACNO), and 3,3'-dichloro-[1,1'-binaphthalene]-2,2'-diol, 2,2'-methylenebis(4-chlorophenol) (BCPhO), 4,4'-isopropylidenebis(o-chlorophenol), and 2,6-bis(2-hydroxy-5-chlorobenzyl)-4-chlorophenol. The one or more organic solvents may include alcohols, ethers, esters, ketone, such as isopropanol, butyl alcohol, di(propylene glycol) momomethyl ether (DPM), dipropylene glycol dimethyl ether (DMM), propylene glycol monopropyl ether (PnP), dimethyl isosorbide, propylene glycol monomethyl ether acetate (MPA), butyl acetate, t-butyl acetate, pentyl acetate, ethylene glycol diacetate, propylene glycol diacetate, methyl isobutyl ketone (MIBK), methyl amyl ketone (MAK), or a combination thereof.

A composite part is disclosed. The composite part includes a thermoplastic composite, an adhesion promoter composition disposed upon a surface of the thermoplastic composite, which may include one or more reactive silanes and one or more swelling agents, where the one or more reactive silanes forms a complex with the one or more swelling agents. The composite part also includes where the adhesion promoter composition diffuses into at least a portion of the thermoplastic composite. The composite part also includes a surface coating disposed upon a surface of the thermoplastic composite where the adhesion promoter has been disposed. Implementations of the composite part can include where the one or more reactive silanes forms a complex through interactions such as hydrogen bonding and/or ionic bonding with the one or more swelling agents. The one or more reactive silanes may form a chemical reaction with surface coating. The thermoplastic composite may include polyaryletherketone (PAEK), polyether ether ketone (PEEK), polyetherketoneketone (PEKK), polyetherimide (PEI), polyimide or a combination thereof. The surface coating may include an epoxy-based polymer formulation, a polyurethane-based polymer formulation, a polysulfide-based polymer formulation, or a combination thereof. The one or more reactive silanes is selected from a group including 3-aminopropyldimethylethoxysilane (APDMES), 3-aminopropyltrimethoxysilane (APTMS), 3-aminopropyltriethoxysilane (APTES), and 3-aminopropylmethyldimethoxysilane (APMDMS). The one or more reactive silanes is selected from a group including bis[3-(trimethoxysilyl)propyl]amine (BTMSPA), 1,2-bis(trimethoxysilyl)ethane (BTMSE). 1,8-bis(trimethoxysilyl)octane (BTMSO), tris[3-(trimethoxysilyl)propyl]isocyanurate (TMSIC), 1,2-bis(triethoxysilyl)ethane (BTESE), 1,8-bis(triethoxysilyl)octane (BTESO), and bis[3-(triethoxysilyl)propyl]tetrasulfide (BTSTS). The other functional group silane may include (3-glycidyloxypropyl)trimethoxysilane (GPTMS), (3-glycidyloxypropyl)triethoxysilane (GPTES), [2-(3,4-epoxycyclohexyl)ethyl]trimethoxysilane (ECTMS), [2-(3,4-epoxycyclohexyl)ethyl]triethoxysilane (ECTES), (3-mercaptopropyl)trimethoxysilane (MPTMS), (3-mercaptopropyl)triethoxysilane (MPTES), 3-(trimethoxysilyl)propyl isocyanate (TMSPI) and 3-(triethoxysilyl)propyl isocyanate (TESPI), or a combination thereof. The one or more swelling agents is selected from a group including 4-chloro-1-naphthol (CNO), 4-chlorophenol (CPhO), and 2,2'-methylenebis(4-chlorophenol) (BCPhO). The one or more swelling agents is selected from a group including phenol or naphthol derivatives, especially chloro substituted phenol or naphthol derivatives, such as 2-chlorophenol (2CPO), 3-chlorophenol (3CPO), 4-chlorophenol (CPhO), 2-amino-4-chlorophenol (ACPO), 2-allyl-4-chlorophenol (ALCPO), 2-benzyl-4-chlorophenol (BCPO), 2-methoxy-4-chlorophenol (MCPO), 4-chloro-1-naphthol (CNO), 2-chloro-1-naphthol (2cno), 1-chloro-2-naphthol (c2no), 2,4-dichloro-1-naphthol (DCNO), 2-allyl-4-chloro-1-naphthol (ACNO), and 3,3'-dichloro-[1,1'-binaphthalene]-2,2'-diol, 2,2'-methylenebis(4-chlorophenol) (BCPhO), 4,4'-isopropylidenebis(o-chlorophenol), and 2,6-bis(2-hydroxy-5-chlorobenzyl)-4-chlorophenol. A molar ratio of the one or more reactive silanes to the one or more swelling agents is from about 0.1:1 to about 1.5:1.

A method for applying an adhesion promoter composition is disclosed. The method for applying an adhesion promoter composition includes contacting a reactive silane compound, a swelling agent, and one or more organic solvents which can include dipropylene glycol dimethyl ether (DMM), propylene glycol propyl ether (PnP), methyl isobutyl ketone (MIBK), or a combination thereof, to prepare an adhesion promoter composition. The method also includes applying the adhesion promoter composition onto a surface of a thermoplastic or thermoplastic composite. The method also includes applying a surface coating over the adhesion promoter composition.

The method for applying an adhesion promoter composition can include heat curing the adhesion promoter at a temperature from about 50° C. to about 200° C. for about 1 minute to about 120 minutes. The method for applying an adhesion promoter composition can include abrading a surface of the thermoplastic or thermoplastic composite prior to applying the adhesion promoter composition onto a surface of a thermoplastic or thermoplastic composite.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate examples of the present teachings and together with the description, serve to explain the principles of the disclosure. In the figures:

FIG. 2 is a schematic of a diffusion-interlocking surface treatment approach, in accordance with the present disclosure.

FIG. 3 is a flowchart illustrating a method for applying an adhesion promoter composition, in accordance with the present disclosure.

Figure 1:
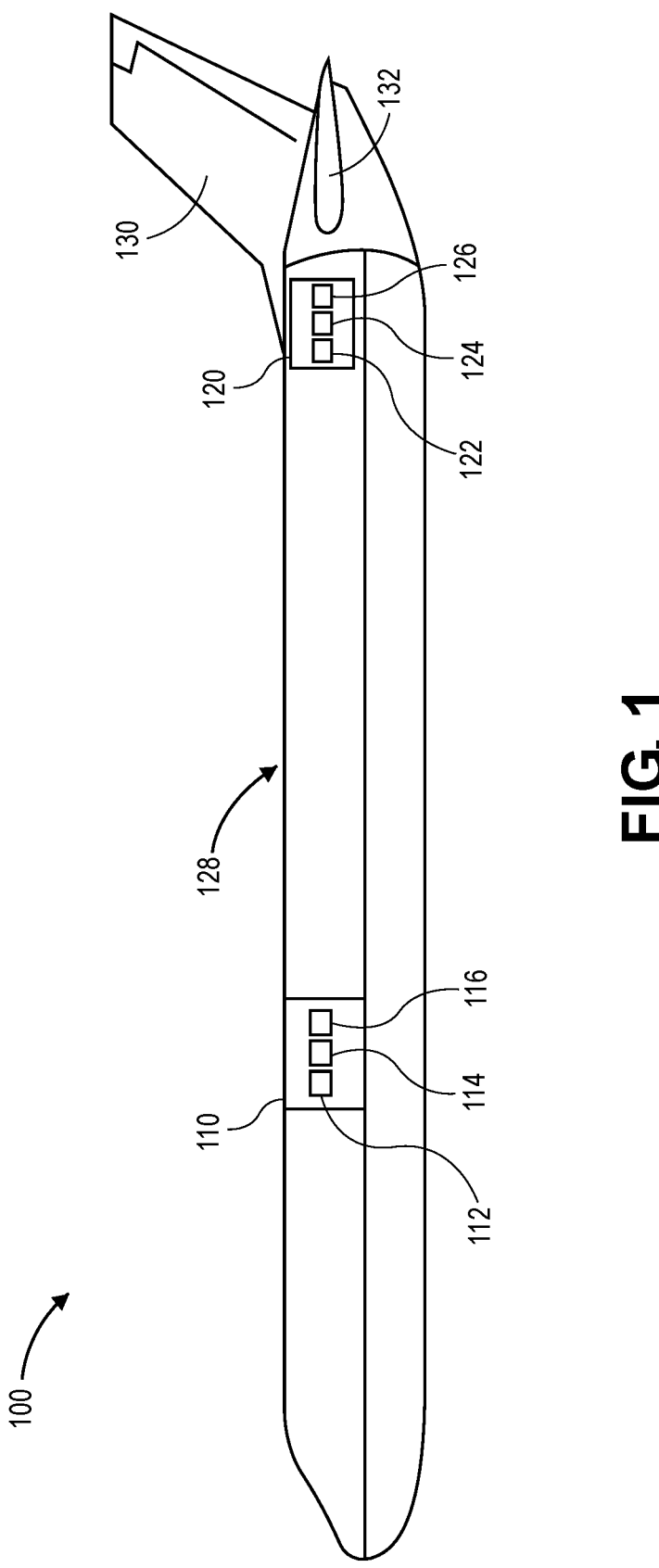
FIG. 1 illustrates a schematic view of a vehicle, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary examples of the present teachings, examples of which are illustrated in the accompanying drawings. Wherever possible, the same reference numbers will be used throughout the drawings to refer to the same, similar, or like parts.

The development of a chemical treatment providing adhesion promotion that would be effective and practical in achieving sufficient adhesion in thermoplastic composite materials, alone or in combination with other surface preparation methods for aerospace composite materials would be advantageous. This adhesion promotion method should be suitable for complex geometries, meet environmental health and safety standards, be compatible with surface preparation of composites for paints, sealants, adhesive, or surface coating applications, and optionally be able to be combined with physical surface preparation techniques, such as sanding or abrasion, in order to be effective.

Additional requirements for adhesion promoters or adhesion promoter compositions for such applications include meeting adhesion requirements, minimization or elimination of the following: adverse effect on cure of subsequent finishes, risk of structural damage to the composite, and added weight. Furthermore, the adhesion promoter composition should possess stability, pot life of at least 4 hours, a sufficient overcoat window for manual application of subsequent finishes, and expedient, simple application.

The present disclosure provides an adhesion promoter composition, including one or more reactive silanes, one or more swelling agents, and one or more organic solvents, wherein the one or more reactive silanes forms a complex with the one or more swelling agents. In implementations, a composite part including a thermoplastic or thermoplastic composite can incorporate one or more adhesion promoter compositions as described herein. In such composites and via application of the adhesion promoter compositions, the adhesion promoter composition diffuses into at least a portion of the thermoplastic or thermoplastic composite, enabling improved adhesion of a surface coating deposited upon one or more surfaces of the thermoplastic or thermoplastic composite where the adhesion promoter has been deposited. The present disclosure further provides methods of application for an adhesion promoter composition, which includes contacting a reactive silane compound comprising an amine-functional group, a swelling agent, and one or more organic solvents comprising dipropylene glycol dimethyl ether (DMM), propylene glycol propyl ether (PnP), methyl isobutyl ketone (MIBK), or a combination thereof, to prepare an adhesion promoter composition, applying the adhesion promoter composition onto a surface of a thermoplastic composite via one or more of automatic or manual application techniques, and applying a surface coating over the adhesion promoter composition.

The following description of various typical aspect(s) is merely exemplary in nature and is in no way intended to limit the disclosure, its application, or uses.

As used throughout, ranges are used as shorthand for describing each and every value that is within the range. Any value within the range may be selected as the terminus of the range. In addition, all references cited herein are hereby incorporated by reference in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

As used herein, "free" or "substantially free" of a material can refer to a composition, component, or phase where the material is present in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, or less than 0.0001 weight % based on a total weight of the composition, component, or phase.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide. As used herein, "about" is to mean within +1-5% of a stated target value, maximum, or minimum value.

All references cited herein are hereby incorporated by reference in their entireties. In the event of a conflict in a definition in the present disclosure and that of a cited reference, the present disclosure controls.

The present disclosure provides one or more adhesion promoter compositions. As used herein, the term "adhesion promoter" refers to a class of materials composed of a liquid reactive silane within an organic solvent and other additives. The adhesion promoter compositions disclosed herein include one or more optional swelling agents capable of or configured to improve upon conventional methods of preparing a surface for treatment or application of a coating, paint, or sealant. For example, as further described herein, the adhesion promoter compositions disclosed herein can be capable of or configured to concurrently or simultaneously penetrate and/or swell one or more top layers of a surface and provide a chemical or physical interlocking component with the surface and one or more ingredients in the adhesion promoter composition. The adhesion promoter compositions disclosed herein are also capable of or configured to provide an improved adhesion of a surface coating such as an adhesive or sealant, with a composite material as compared to currently known adhesives or adhesion promoters known in the art.

The present disclosure provides adhesion compositions and application methods for providing a suitable adhesion for complex geometries, compositions meeting various regulatory approvals related to environmental health and safety, inherent removal of residual mold release agents or other factory contaminants from composite part surfaces. Furthermore, the adhesion promoter of the present teachings is suitable for combination with physical surface preparation techniques, such as solvent wiping with isopropyl alcohol or other cleaning solvents, grit-blasting, sanding or abrasion with sandpaper or mild abrasives, for example, Scotch-Brite™, in order to be effective, if necessary. Additional features of the present disclosure include an adhesion promoter composition having no adverse effect on cure of subsequent finishes, no risk of structural damage to any composites, minimum added weight, stability, adequate pot life, and a short minimum overcoat time at ambient temperature.

FIG. 1 illustrates a schematic view of a vehicle 100, according to an implementation. As shown, the vehicle 100 may include an airplane. The vehicle 100 may also or instead include other types of aircrafts such as helicopters, unmanned aerial vehicles (UAVs), spacecrafts, or the like. In other implementations, the vehicle 100 may be or include a car, a boat, a train, or the like. In yet other implementations, the system and method described below may not be implemented in a vehicle, and rather may be implemented in a building.

The vehicle 100 may include one or more lavatories (one is shown: 110). The lavatory 110 may include a sink 112, a toilet 114, and a sensor 116. The sensor 116 may sense/determine whether the lavatory 110 is occupied (e.g., by a passenger) or unoccupied. For example, the sensor 116 may be or include a motion sensor. The vehicle 100 may also include one or more kitchens or galleys (one is shown: 120). The kitchen 120 may include a sink 122, a dishwasher 124, and an ice maker 126. Integrated on or into one or more internal or external surfaces or components of the vehicle 100, a composite material 128, 130, 132 including adhesion promoter compositions or methods of application thereof as described herein may be applied to improve adhesion between composite layers or coatings thereupon. The one or more components 128, 130, 132 may include, for example, an adhesion promoter composition, used in applying one or more layers or alternatively improving adhesion between a composite material and one or more applied coatings or sealants.

Examples of polymer materials that can be used (e.g., as a substrate) that undergoes surface coating with an adhesion promoter composition and/or subsequent surface coating layer in accordance with the present disclosure include polymer materials that act as a matrix in combination with one or more types of fibers. In one example, materials useful for the practice of the present disclosure include fiber-reinforced plastics (FRP) comprising a polymer material in combination with an inorganic fiber such as fibers of carbon, carbon nanotubes, graphite, fiberglass, glass, metals, metal alloys, or metalized fibers and metal coated glass fibers, alumina fiber or boron fiber. In one example, the fiber reinforced plastic can comprise organic fiber such as a nylon fiber, or aramid fiber. In one example, the fiber reinforced plastic can comprise organic fiber and/or inorganic fiber blended into a thermosetting or epoxy.

In one example, a carbon fiber reinforced plastic (CFRP) or glass fiber reinforced plastic (GFRP) as the polymer article made therefrom is imparted with improved interlayer adhesion with the use or application of adhesion promoter compositions suitable for aircraft structures or the like. However, the present disclosure is not restricted to these types of materials, and articles formed from other polymers can also be used in the presently disclosed process of the present disclosure.

Components, parts or composite parts, such as Carbon Fiber Reinforced Polymer (CFRP) parts, are initially laid-up in multiple layers that together are referred to as a "preform." As used herein the term "uncured composite part" or "preform" refers to one or more plies of composite materials impregnated with resin that is uncured or in some instances partially cured. For example, the uncured composite part may be a fiber-reinforced uncured thermoset polymer composite part. Individual fibers within each layer of the preform may be aligned parallel with each other, but different layers may exhibit different fiber orientations to increase a strength of the resulting composite part along different dimensions. The preform may include a viscous resin that solidifies to harden the preform into a composite part (e.g., for use in an aircraft). Carbon fiber plies that have been impregnated with an uncured thermoset resin or a thermoplastic resin are referred to as "pre-preg." As used herein, the term "pre-preg" refers to pre-impregnated stacks of composite plies, such as epoxy impregnated unidirectional composite tape, woven plies, or chopped pieces of such. A pre-preg may be flexible until it is cured, often by heat and pressure curing or curing within an autoclave. Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may return to a reformable or viscous form if it is re-heated.

With respect to fiber-reinforced thermoset polymer composite parts, curing generally refers to the application of heat and/or pressure to crosslink and consolidate the fibers of a fiber-reinforced thermoset polymer composite part. While thermoset resins can be partially cured (i.e. crosslinked) without the application of pressure, it often results in a poorly consolidated part. Accordingly, as used herein, the terms "cure" and "curing" include both the application of heat (to cure/crosslink) and the application of pressure (to consolidate) fiber-reinforced thermoset polymer composite parts, such as the thermoset composite parts of the present disclosure.

In some implementations, a composite part is cured by subjecting it to heat and/or pressure. The heat and/or pressure may be applied according to a predetermined cure schedule specifying applied pressures, temperatures, and durations for which the pressures and/or temperatures are maintained. In some implementations, the composite part is cured by pressure alone. For example, the composite part may be cured at room temperature with the application of pressure. The pressure may be positive pressure or negative pressure. Adhesion promoter compositions may be used in the fabrication or treatment of such composite parts either on one or more surfaces or in between layers for at least the purpose of improving adhesion between layers or to improve adhesion of a surface coating onto a composite materials or part. While composite materials incorporating thermoset resins can be applicable to the adhesion formulations described in the present disclosure, they can also be applied to thermoplastic materials.

Figure 2:
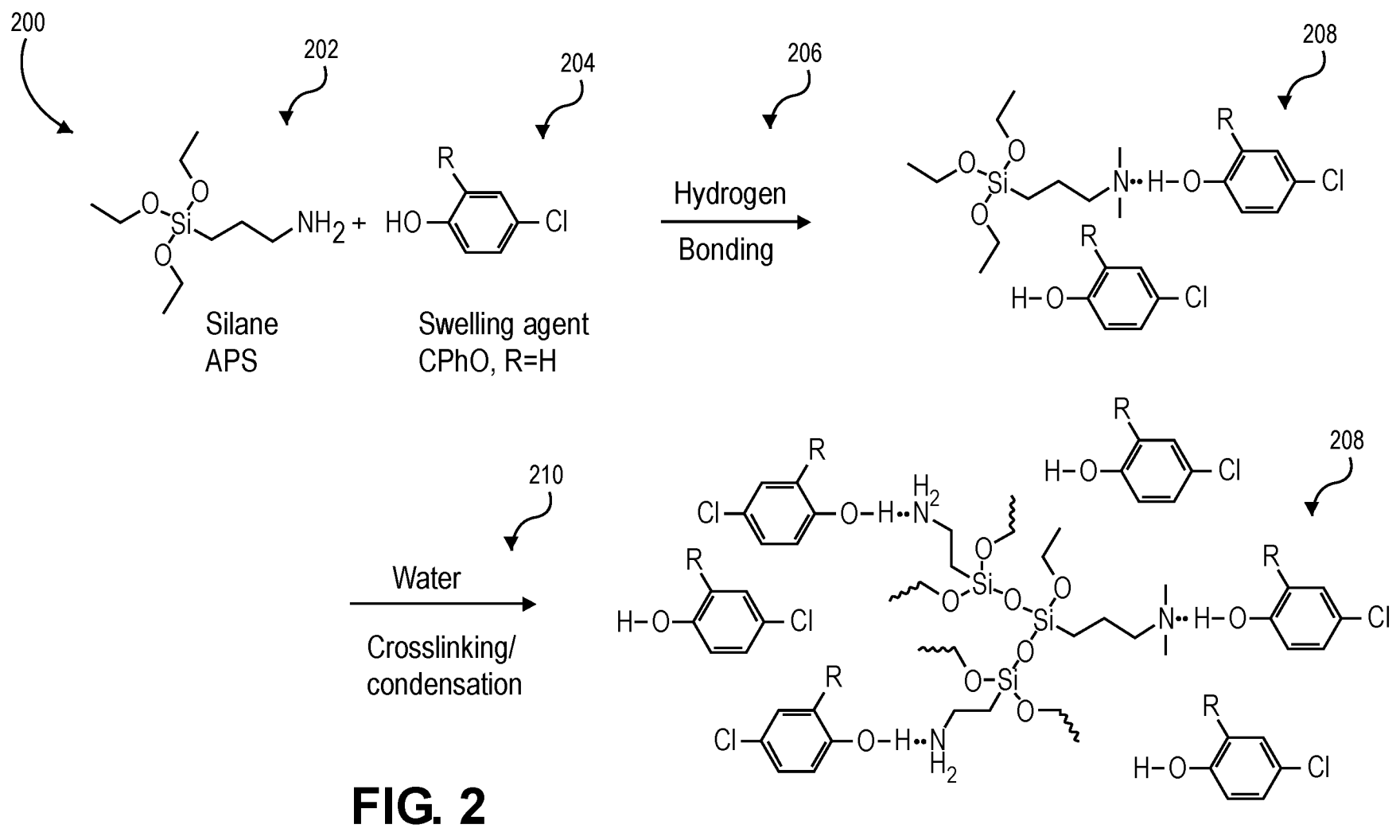

FIG. 2 is a schematic of the adhesion promoter technology described, referred to as a 'diffusion-interlocking surface treatment' approach, in accordance with the present disclosure. A diffusion-interlocking surface treatment is a concept based on the swelling of surface thin layer of a polymer followed by subsequent interaction of reactive silanes or other cross-linkable chemicals, which can form interfacial crosslinked networks and a reinforced adhesion layer. These interfacial crosslinked networks can be produced via the formation of a complex between one or more reactive silanes or other crosslinkable chemicals and one or more swelling agents through interactions such as hydrogen bonding and/or covalent bonding. The diffusion-interlocking approach is based on the chemical inertness of the polymer backbone of PAEK, other thermoplastic or thermoset composite materials and a need to reinforce adhesion through both chemical and physical means using a common approach. An example of the diffusion-interlocking approach is described in FIG. 2. The proposed mechanism 200 involves three stages. First, diffusion of the active components, in this case an aminosilane 202, in this example, APS, and a swelling agent 204, allows the surface and subsurface layer to be penetrated by the adhesion promoter composition. This requires some swelling of the subsurface for active ingredients to penetrate that sub-layer. Next, crosslinking 206 of active components through sol-gel hydrolysis and condensation reactions, or other crosslinking mechanism, such as covalent or hydrogen bonding, leads to a formation of a complex 208 to provide interlocking and reinforce adhesion. Finally, the active layer provides strong bonding with coatings, sealants, or another surface finish, through reaction 210 or interaction between the functionalities of activator and the reactive chemicals of surface finish, or through molecular entanglement/network. In examples, the adhesion promoter, by virtue of its ingredients can form an interpenetrating polymer network (IPN) within the adhesion promoter composition or interpenetrating with the composite surface. An interpenetrating polymer network (IPN) can refer to a polymer or polymeric layer including at least two polymer networks which are at least partially reacted with one another. In the adhesion promoter of the present teachings, a reactive silane and a swelling agent interact and through hydrolysis and condensation they form an IPN. In examples including amine-functional groups, the amine groups can also react with a primer, which can be applied after an adhesion promoter composition. The two or more networks can be considered to be entangled physically, and in some cases chemically, but usually irreversibly. In the example given in FIG. 2, the swelling agent is 4-chlorophenol (CPhO), a known good solvent for PEEK and other PAEK's. The active ingredient is 3-aminopropyltriethoxysilane (APS). The aminosilane 202 and swelling agent 204 can form hydrogen bonds or ionic bonds because CPhO is a weak acid and aminosilane is a weak base, which induces network formation and prevents the CPhO or silane from volatilization. After exposure to atmospheric moisture (or by pre-dosing the silane with water), the silane undergoes hydrolysis 210 and condensation to form a sol-gel like coating 212. The active ingredients are typically around 5% or less in a mixed solvent solution to form a very thin film on the composite surface.

The one or more adhesion promoters can include, but are not limited to, one or more compounds including at least one or more reactive silanes, at least one or more swelling agents, one or more organic solvents, wherein the one or more reactive silanes forms a complex with the one or more swelling agents. Organosilanes or reactive silanes are generally understood to be, but not necessarily limited to, multifunctional silicon-containing molecules that include a reactive functional group and one or more hydrolysable alkoxy group. Illustrative silanes can include, but are not limited to amine-functional silanes, epoxy-functional silanes, mercapto-functional silanes, isocyanate-functional silanes, multi-alkoxy-functional silanes, or a combination thereof. Furthermore, illustrative silanes may include trialkoxy silanes, such as trimethoxy, triethoxy, tripropoxy, dialkoxy silanes, such as dimethoxy, diethoxy, dipropoxy, monoalkoxy silanes, such as dimethylmethoxy, dimethylethoxy, diethylmethoxy, diethylethoxy, or a combination thereof.

Illustrative amine-functional silanes can include, but are not limited to 3-aminopropyltrimethoxysilane (APTMS), 3-aminopropyltriethoxysilane (APS), 3-aminopropylmethyldimethoxysilane (APMDMS), 3-aminopropylmethyldiethoxysilane (APMDES), 3-aminopropyldimethylethoxysilane (APDMES), 3-(2-aminoethylamino)propyltrimethoxysilane (AEPTMS), 3-(2-aminoethylamino)propyltriethoxysilane (AEPTES), 3-(2-aminoethylamino)propyldimethoxymethylsilane (AEDMMS), 3-(2-aminoethylamino)propyldiethoxymethylsilane (AEDMES), 3-[2-(2-aminoethylamino)ethylamino]propyltrimethoxysilane (TMSDETA), and 3-[2-(2-aminoethylamino)ethylamino]propyltriethoxysilane (TESDETA), [[3-]]3-aminopropyltris(2-(2-methoxyethoxy)ethoxy)silane, 3-aminopropyltriisopropenyloxysilane, 3-aminopropyltri(butanone oximo)silane, 4-aminobutyltriethoxysilane, N-2-(aminoethyl)-3-aminopropyltris(2-ethylhexoxy)silane, 3-aminopropyldimethylethoxysilane, 3-aminopropyldiisopropylethoxysilane, p-aminophenyltrimethoxysilane, m-aminophenyltrimethoxysilane, 3-aminopropylphenyldiethoxysilane, and cyclic azasilanes, such as 2,2-dimethoxy-1,6-diaza-2-silacyclooctane, 2,2-dimethoxy-N-n-butyl-1-aza-2-silacyclopentane, 2,2-diethoxy-1-aza-2-silacyclopentane, 2,2-dimethoxy-N-t-butyl-1-aza-2-silacyclopentane, 2,2-dimethoxy-N-methyl-1-aza-2-silacyclopentane, 2,2-dimethoxy-N-allyl-1-aza-2-silacyclopentane. 3-aminopropyltriethoxysilane and 3-aminopropyltrimethoxysilane, or combinations thereof.

Illustrative glycidoxy functional or epoxy functional silanes can include, but are not limited to, glycidoxypropyltrialkoxysilane (such as glycidoxypropyltrimethoxysilanes, (3-glycidyloxypropyl)trimethoxysilane (GPTMS), (3-glycidyloxypropyl)triethoxysilane (GPTES), and the like), 3-(2,3-epoxypropoxypropyl)methyldiethoxysilane, 2-(3,4-epoxycyclohexyl)ethyltrimethoxysilane, 3-(2,3-epoxypropoxypropyl)methyldimethoxysilane, [2-(3,4-epoxycyclohexyl)ethyl]trimethoxysilane (ECTMS), 2-(3,4-epoxycyclohexyl)ethylmethyldimethoxysilane, 8-glycidoxyoctyltrimethoxysilane, 1-(3-glycidoxypropyl)-1,1,3,3,3-pentaethoxy-1,3-disilapropane, or combinations thereof.

Illustrative mercapto-functional silanes may include, but are not limited to, (3-mercaptopropyl)trimethoxysilane (MPTMS), (3-mercaptopropyl)triethoxysilane (MPTES), 11-mercaptoundecyltrimethoxysilane, s-(octanoyl)mercaptopropyltriethoxysilane, (mercaptomethyl)methyldiethoxysilane, 3-mercaptopropylmethyldimethoxysilane, mercaptopropyltrialkoxysilanes (such as mercaptopropyltrimethoxysilanes 3-Mercaptopropyltrimethoxysilane), mercaptoundecyltrimethoxysilane, (mercaptomethyl)methyldiethoxysilane, or combinations thereof.

Illustrative isocyanurate-functional silanes may include, but are not limited to, tris-(triethoxysilylpropyl)isocyanurate, tris[3-(trimethoxysilyl)propyl]isocyanurate (TMSIC), and the like. Illustrative isocyanate-functional silanes include, but are not limited to 3-(trimethoxysilyl)propyl isocyanate (TMSPI) and 3-(triethoxysilyl)propyl isocyanate (TESPI), (isocyanatomethyl) methyldimethoxysilane, isocyanatopropylmethyldimethoxysilane, 3-isocyanatopropyl methyldiethoxysilane, or combinations thereof.

Illustrative multialkoxy-functional silanes may include, but are not limited to, bis-trimethoxysilane, a bis-triethoxysilane, a tris-trimethoxysilane, tris-triethoxysilane, or a combination thereof. Examples, further include, but are not limited to, bis[3-(trimethoxysilyl)propyl]amine (BTMSPA), 1,2-bis(trimethoxysilyl)ethane (BTMSE). 1,8-bis(trimethoxysilyl)octane (BTMSO), 1,2-bis(triethoxysilyl)ethane (BTESE), 1,8-bis(triethoxysilyl)octane (BTESO), and bis[3-(triethoxysilyl)propyl]tetrasulfide (BTSTS), or a combination thereof.

Additional illustrative silanes can include, but are not limited to, bis(trimethoxysilylethyl)benzene, bis(triethoxysilylethyl)benzene, 3-acryloxypropyltrimethoxysilane, 3-methacryloxypropyltrimethoxysilane, vinyl trimethoxysilane, allyl trimethoxysilane, or combinations thereof.

In examples of adhesion promoter compositions, where more than one reactive silane is included in the composition, it can be advantageous for a first reactive silane to be different than a second reactive silane, such that additional organic functionality can be added to the adhesion promoter composition, thus providing additional potential reactive functional groups present in the adhesion promoter composition. Without being bound by any particular theory, additional functional group chemistry within the adhesion promoter composition may provide versatility or utility for the adhesion promoter composition to be used in numerous applications with respect to swelling agents, polymer composite materials, substrates, surface coatings, or a combination thereof.

The one or more reactive silanes can be present in an amount of from about 0.01 weight % to about 10 weight %, based on a total weight of the adhesion promoter composition. For example, the one or more reactive silanes can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the adhesion promoter composition. In another example, the one or more reactive silanes can be present in an amount of from about 0.1 weight % to about 10 weight %, about 2 weight % to about 8 weight %, or about 4 weight % to about 6 weight %.

Swelling agents of the present teachings provide at least a partial swelling of a surface or subsurface as at least one or more active ingredients and added to an adhesion promoter in order to penetrate a layer or sub-layer. Swelling agents further include a functional group capable of interlocking or crosslinking through sol-gel, or other crosslinking mechanism, such as covalent or hydrogen bonding, to form a complex to provide interlocking and reinforce adhesion when using an adhesion promoter composition as described herein.

Illustrative examples of swelling agents used in adhesion promoter compositions of the present disclosure include, but are not limited to, 4-chloro-1-naphthol (CNO), 4-chlorophenol (CPhO), and 2,2'-methylenebis(4-chlorophenol) (BC-PhO), or a combination thereof. Additional examples of swelling agents can include, but are not limited to, phenol or naphthol derivatives, chloro-substituted phenol or naphthol derivatives, such as 2-chlorophenol (2CPO), 3-chlorophenol (3CPO), 4-chlorophenol (CPhO), 2-amino-4-chlorophenol (ACPO), 2-allyl-4-chlorophenol (AlCPO), 2-benzyl-4-chlorophenol (BCPO), 2-methoxy-4-chlorophenol (MCPO), 4-chloro-1-naphthol (CNO), 2-chloro-1-naphthol (2CNO), 1-chloro-2-naphthol (C2NO), 2,4-dichloro-1-naphthol (DCNO), 2-allyl-4-chloro-1-naphthol (ACNO), and 3,3'-dichloro-[1,1'-binaphthalene]-2,2'-diol, 2,2'-methylenebis (4-chlorophenol) (BCPhO), 4,4'-isopropylidenebis(o-chlorophenol), 2,6-Bis(2-hydroxy-5-chlorobenzyl)-4-chlorophenol, or combination thereof.

The one or more swelling agents can be present in an amount of from about 0.01 weight % to about 10 weight %, based on a total weight of the adhesion promoter composition. For example, the one or more swelling agents can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the adhesion promoter composition. In another example, the one or more swelling agents can be present in an amount of from about 0.1 weight % to about 10 weight %, about 2 weight % to about 8 weight %, or about 4 weight % to about 6 weight %.

In certain descriptions of composition of adhesion promoter compositions of the present disclosure, a molar ratio of silane to swelling agent may be utilized. The molar ratio of silane to swelling agent may be expressed as silane: swelling agent or as silane/swelling agent, or as a fraction. In examples, the silane:swelling agent is from about 0.1 to about 2.0, or from about 0.1:1 to about 2:1.

The one or more organic solvents of the adhesion promoter composition can be capable of or configured to disperse, solubilize, solvate, or otherwise dissolve one or more substances or components of the adhesion promoter composition. The one or more organic solvents of the adhesion promoter composition can also be capable of or configured to disperse, solubilize, solvate, or otherwise dissolve one or more substances, such as greases, oils, or debris, on surfaces contacted with the adhesion promoter composition. For example, the one or more organic solvents of the adhesion promoter composition can be capable of or configured to dissolve the one or more reactive silanes, the one or more swelling agents, any additional functional additives, or combinations thereof. The one or more organic solvents can also be capable of or configured to prepare a surface for subsequent treatment or application of a surface coating. For example, the one or more organic solvents can be capable of or configured to at least partially provide a cleaning treatment or enhance the swelling properties of the swelling agent when contacting a surface or substrate that is to be treated with a coating. It should be appreciated that any organic solvent capable of or configured to dissolve one or more components of the adhesion promoter composition and/or prepare the surface for subsequent treatment or application of a surface treatment or coating can be utilized.

The one or more organic solvents can be or include, but are not limited to, aliphatic hydrocarbons, aromatic compounds, such as aromatic hydrocarbons, halogenated hydrocarbons, nitrated hydrocarbons, ketones, amines, esters, alcohols, aldehydes, ethers, or the like, or combinations thereof.

Illustrative aliphatic hydrocarbon that can be utilized as the one or more organic solvents can be or include, but are not limited to, n-pentane, n-hexane, n-heptane, n-octane, n-nonane, n-decane, white spirits, petroleum ethers with boiling range of 40-60° C. or 60-80° C. or 100-130° C., Isopar C, Isopar E, Isopar G, Isopar H, Isopar J and Isopar K or homologues thereof, 2,2,4-trimethyl pentane, or the like, cyclohexane, turpentine, limonene or any combination thereof.

Illustrative aromatic compounds that can be utilized as the one or more organic solvents can be or include, but are not limited to benzene, toluene, ethylbenzene, xylene, tetralin, hexafluoro xylene, or the like, Solvesso 100, solvesso 100S, Solvesso 150, Solvesso 150ND, 4-chlorobenzotrifluoride, or the like, or any combination thereof.

Illustrative halogenated hydrocarbons that can be utilized as the one or more organic solvents can be or include, but are not limited to, carbon tetrachloride, chloroform, dichloroethane, trichloro ethylene, tetrachloroethylene, dichloromethane, or the like, or combinations thereof.

Illustrative ketone organic solvents can be or include, but are not limited to, acetone, methyl ethyl ketone (MEK), diethyl ketone, methyl propyl ketone (MPK), dipropyl ketone, methyl isopropyl ketone, isophorone, methyl isobutyl ketone (MIBK), cyclopentanone, cyclohexanone, methyl amyl ketone (MAK), diisobutyl ketone, acetophenone, or the like, or combinations thereof.

Illustrative esters that can be utilized as the one or more organic solvents can be or include, but are not limited to, methyl acetate, ethyl acetate, propyl acetate, isopropyl acetate, n-butyl acetate, isobutyl acetate, t-butyl acetate, pentyl acetate, isoamyl acetate, cellosolve acetate, γ-Valerolactone, ethyl lactate, butyl lactate, dimethyl carbonate, diethyl carbonate, ethylene carbonate, propylene carbonate, ethyl butyrate, or the like, or combinations thereof.

Illustrative alcohols that can be utilized as the one or more organic solvents can be or include, but are not limited to, methanol, ethanol, n-propanol, isopropanol, n-butanol, s-butanol, n-amyl alcohol, i-amyl alcohol, cyclohexanol, n-octanol, ethanediol, diethylene glycol, 1,2-propanediol, or the like, or combinations thereof.

Illustrative ethers that can be utilized as the one or more organic solvents can be or include, but are not limited to, diethyl ether, diisopropyl ether, dibutyl ether, methyl tert butyl ether, 1,4-dioxane, tetrahydrofuran, cyclopentyl methyl ether, 2-methyltetrahydrofuran, ethylene glycol monomethyl ether, ethylene glycol monoethyl ether, ethylene glycol propyl ether, ethylene glycol monobutyl ether, diethylene glycol butyl ether, di(propylene glycol) monomethyl ether (DPM), dipropylene glycol dimethyl ether (DMM), propylene glycol monomethyl ether, propylene glycol monopropyl ether (PnP), propylene glycol butyl ether, dimethyl isosorbide, propylene glycol monomethyl ether acetate (MPA), ethylene glycol methyl ether acetate, ethylene glycol ethyl ether acetate, ethylene glycol diacetate, propylene glycol diacetate, oligomers of perfluoropolyethers, such as the GALDEN® line, which is commercially available from Solvay of Houston, TX, or the like, or combinations thereof.

The amount of the one or more organic solvents present in the adhesion promoter composition can be from about 75 weight % to about 99.5 weight %, based on a total weight of the adhesion promoter composition. For example, the amount of the one or more organic solvents present in the adhesion promoter composition can be from about 75 weight %, about 80 weight %, about 85 weight % or about 90 weight % to about 95 weight %, about 98 weight %, about 99 weight %, or about 99.5 weight %, based on a total weight of the adhesion promoter composition. In another example, the amount of the one or more organic solvents present in the adhesion promoter composition may be from about 75 weight % to about 99.5 weight %, about 80 weight % to about 99 weight %, about 85 weight % to about 95 weight %, or about 85 weight % to about 90 weight %, based on a total weight of the adhesion promoter composition. In another example of an adhesion promoter composition, the solvent can be present in an amount of from about 25 weight %, about 30 weight %, about 35 weight %, or about 40 weight %, based on a total weight of the adhesion promoter composition. In another example, the solvent can be present in an amount of from about 25 weight % to about 40 weight %, about 25 weight % to about 30 weight %, or about 30 weight % to about 40 weight %.

Methods for preparing any one or more of the adhesion promoter compositions disclosed herein are provided. The method can include combining, mixing, blending, or otherwise contacting the one or more organic solvents, the one or more reactive silanes, the one or more swelling agents, any optional catalysts or optional functional additives with one another to prepare a mixture. It should be appreciated that the order of mixing or contacting each of the components of the adhesion promoter composition can be at least partially determined by the specific components selected. The method can also include purging the mixture with nitrogen to remove dissolved oxygen or other contaminants.

The method can also include mixing methods, including but not limited to, homogenizing the adhesion promoter composition via shearing and/or dicing in an industrial blender, immersion blender, centrifugal mixer, stirring mechanism, shaker, or the like, or any combination thereof. The adhesion promoter composition can be subjected to mixing for a period of from about 5 seconds (sec), about 10 sec, about 30 sec, or about 1 min to about 2 min, about 3 min, about 5 min, about 10 min, about 30 min, or greater.

FIG. 3 is a flowchart illustrating a method for applying an adhesion promoter composition, in accordance with the present disclosure. A method for applying an adhesion promoter composition 300, can include contacting a reactive silane compound comprising an amine-functional group, a swelling agent, and one or more organic solvents comprising dipropylene glycol dimethyl ether (DMM), propylene glycol propyl ether (PnP), methyl isobutyl ketone (MIBK), or a combination thereof, to prepare an adhesion promoter composition 302, applying the adhesion promoter composition onto a surface of a thermoplastic composite 304, and applying a surface coating over the adhesion promoter composition 306. The surface coating may require an additional application of a primer prior to the application of a surface coating, paint, or composition including a polymer. The surface coating can include an epoxy-based polymer formulation, a polyurethane-based polymer formulation, a polysulfide-based polymer formulation, or a combination thereof. The method for applying an adhesion promoter composition can include where the thermoplastic component includes polyaryletherketone (PAEK), polyether ether ketone (PEEK), polyetherketoneketone (PEKK), polyetherimide (PEI), polyimide or a combination thereof. Additional examples of suitable materials or composites can include polyamide, polyimide, poly(amide-imide), polyetherimide (PEI), polysulfone, polyphenylsulfone, polybenzimidazole, and other high melting thermoplastics. The adhesion promoter composition used in the method for applying an adhesion promoter composition can include components or ingredients as described herein. The application of the adhesion promoter composition onto a surface of a thermoplastic composite further can include applying the adhesion promoter composition onto the surface of the thermoplastic composite. In examples, the reactive silane forms a chemical reaction with a surface, primer, or surface coating. The application methods can include spraying, brushing, dipping, rolling, wiping, or a combination thereof, in addition to other known application methods known to one skilled in the art. In certain examples, grit blasting or other surface preparation techniques can be used. The adhesion promoter composition, can include one or more reactive silanes having a general formula of: $((RO)n\text{-}SiY)m\text{-}(CH2)x\text{-}A$, where $n=2\text{-}3$, $m=1\text{-}2$, and Y does not exist (when $n=3$) or is a C1-C6 alkyl group, $x=1\text{-}8$, A=None, NHz, SH, or epoxy, $z=1\text{-}2$ and R=C1-C6 alkyl, one or more swelling agents, and one or more organic solvents, and wherein the one or more reactive silanes forms a complex with the one or more swelling agents through hydrogen bonding and/or ionic bonding.

Additional steps of the method for applying an adhesion promoter composition can include heating or abrasion of the surface of the thermoplastic or thermoplastic composite, such as heat curing the adhesion promoter at a temperature from about 50° C. to about 200° C. for about 1 minute to about 120 minutes or abrading a surface of the thermoplastic composite prior to applying the adhesion promoter composition onto a surface of a thermoplastic composite. The method for utilizing the adhesion promoter composition to treat the surface can include one or more heating methods. Heating methods can include, but are not limited to, ambient heating or evaporation, convection heating, infrared radiation heating, induction heating, or a combination thereof. In examples, the method may include a step of pausing, waiting, dwelling, or allowing a composite treated with an adhesion promoter composition to flash off or evolve solvents at ambient conditions prior to any heating step at elevated temperatures. Such an evaporation step can also be done with the use of a heat gun or infrared lamp, or any of the heating methods as disclosed herein. In implementations, heat curing can be done for 30 minutes at a temperature of 120° C., or from about 1 minute to about 60 minutes, or from about 5 minutes to about 45 minutes, or from about 10 minutes to about 30 minutes. Heating temperatures can be from about 50° C. to about 200° C., or from about 70° C. to about 175° C., or from about 80° C. to about 150° C.

Surfaces or substrates used in the application of an adhesion promoter may include, but are not limited to, aluminum, titanium, carbon fiber composites, carbon fiber reinforced composites, glass fiber composites, thermoplastics, thermoset, or combinations thereof. For example, the surface can be a surface of a bridge truss, support column, construction object, building, vehicle, such as an atmospheric vehicle, an aerospace vehicle, an unmanned vehicle, an aircraft, a spacecraft, a satellite, a rocket, a missile, or the like, or any components thereof. In exemplary examples, the polymer formulation layer in the method of applying an adhesion promoter composition may include an epoxy-based polymer formulation, a polyurethane-based polymer formulation, a polysulfide-based polymer formulation, polyaryletherketones (PAEK), such as polyether ether ketone (PEEK), polyetherketoneketone (PEKK) or a combination thereof. The adhesion promoter composition can be stored inert, stored at room temperature, stored in a refrigerator, stored in a freezer, or a combination thereof. In certain examples, the adhesion promoter composition can be allowed to come to room temperature prior to mixing or use. In certain aspects, a substrate or surface can be prepared before application of adhesion promoter with an optional degreasing solvent wipe and can subsequently be applied to a substrate via spray, brush, roller, wipe, wipe on/wipe off, pouring, or a combination thereof.

The method of applying an adhesion promoter composition can include separating the one or more particles and/or relatively larger adhesion promoter agglomerations from the adhesion promoter composition after homogenization or mixing. For example, the method can include separating the particles and/or relatively larger adhesion promoter agglomerations from the adhesion promoter composition via filtration. Filtration can include passing the adhesion promoter composition including the one or more particles (e.g., glass particles) and/or the relatively larger adhesion promoter agglomerations through a filter having a pore size less than about 1 mm, less than about 0.5 mm, less than about 0.25 mm, or less than about 0.1 mm.

The method for utilizing the adhesion promoter composition to treat the surface can include applying or contacting the adhesion promoter composition with the surface. The adhesion promoter composition can be contacted with the surface via a brush, a gauze, a roller, a syringe, an extrusion gun, a spray gun, or the like, or any combination thereof. The adhesion promoter composition can also be applied with the use of a Sempen® Applicator, available from PPG Industries, Inc. Sylmar, California. The adhesion promoter composition can be capable of or configured to eliminate one or more steps in the conventional process or method of preparing a surface for the application of a sealant, surface treatment, surface coating, and the like. For example, in a conventional process of preparing a surface for the application of a sealant, adhesive, surface treatment, or surface coating, the surface is first treated with a solvent, and subsequently treated with an adhesion promoter or formation of an adhesion promoter film.

EXAMPLES

While exemplary examples of an adhesion promoter composition are described in regard to the accompanying tables, it should be noted that alternate compositions, ratios of ingredients or specific ingredients as relayed in the present teachings can be used in the composition and application of adhesion promoters as described herein.

Materials: Swelling solvent or compounds, including 4-chloro-1-naphthol (CNO), 4-chlorophenol (CPhO), were purchased from Aldrich. 2,2'-Methylene bis(4-chlorophenol) (BCPhO) were purchased from TCI. Solvents, including propylene glycol propyl ether (PnP), Dipropylene glycol dimethyl ether (DMM) were from Aldrich. Methyl isobutyl ketone (MIBK) were purchased from Sydney Solvent (commercial grade, 20 L) and isopropanol was from Merck. Silanes, including 3-aminopropyltriethoxysilane (APS), 3-aminopropyltrimethoxysilae (APTMS), 3-aminopropylmethyldimethoxysilane (APMDMS), and 3-aminopropylmethyldiethoxysilane (APMDES) were all products of Aldrich. PAEK composites included carbon fiber reinforced PEEK, fiberglass reinforced PEKK, or carbon fiber reinforced PEKK were provided by Boeing. Organic solvent primer, BMS10-103 Gr A, 45GY005 Chrome-Free Water Reducible Epoxy Primer, and BMS10-60 Desothane topcoat (CA8000/B70846/CA8000B) were purchased from PPG. PR-1776M class B low weight fuel tank sealant was purchased from PPG Aerospace.

Preparation of diffusion-interlocking solutions (3.5% APMDES/BCPhO=0.375 solution as example): Generally, the solution was prepared in 3 steps. Step 1 includes the preparation of the mixed solvent, in this example, of 50% MIBK, 20% DMM and 30% PnP. 500 g MIBK, 300 g PnP and 200 g DMM were weighed into a 1.5 L bottle. The mixture was magnetically stirred at 250 rpm for 5 minutes to form a transparent, clear solution. Step 2 includes the preparation of BCPhO solution. In a 1.5 L Schott bottle with lid, 23 g BCPhO was added, followed by 965 g of the mixed solvent. The mixture was magnetically stirred at 250 rpm for 5 minutes to give a transparent, yellow solution. Step 3 includes the preparation of the adhesion promotor spray solution (AP). 12 g of APMDES was added into the solution in step 2. The solution was magnetically stirred at 250 rpm for 10 minutes. After standing for 1 hour at room temperature, the solution was ready for spraying/application. Preparation procedure is meant for illustrative purposes and may include alternative or supplementary methods or materials as disclosed in the present teachings.

Application of adhesion promoter diffusion-interlocking solutions: The sanded or unsanded BMS8-422, BMS8-429 or BMS8-399 composite was cleaned by wiping with IPA several times. The solution was sprayed onto samples using a high-volume low pressure (HVLP) spray. The coating was dried in air for 30 min, then heated at 120° C. for 30 min.

Preparation of sealant and adhesion samples: Composite samples were cut to 25×100 mm from a composite panel supplied by Boeing using a diamond saw. Cotton fabric or coated fiber glass mesh were used as peel media. One end of the composite coupon was covered with 18 mm wide 3M Scotch tape to facilitate creation of a de-bonded area at the composite surface for peel off test. Freshly prepared sealant was applied to both PEEK composite surface and peel media (both surfaces) and care was taken to ensure complete wetting of the sealant on the test area. The peel media and composite coupon were then placed in an in-house made sample holder and clamped with metal clamps. Excess of sealant were squeezed out from the running channel and the 3.1 mm sealant thickness between composite and peel media was obtained. The two-part sealant was mixed just before applying according to manufacturer's instruction. The assembly was cured at room temperature for 14 days.

Preparation of coated and adhesion samples: The composite panels were cleaned with IPA and wiped with AC12165 DuPont Aerospace wipes BMS 15-5F before and after sanding. Sanding was carried out with Flexovit 180 grit aluminum oxide sandpaper using a combination of pneumatic orbital and hand sanding for a period of about 1 minute to achieve a uniform de-glossed finish. The sandpaper was replaced after every sanding 2 samples. Spray painting was carried out with a MACH 1A HVLP Automatic Spray gun with 1.4 Ø mm fluid nozzle and 94P cap. The inlet pressure was set to 40 PSI. In coatings conforming to Configuration I, only primer, was used as the coating stack up as shown in Table 1. The primer and topcoat were used after the surface treatments for the remaining samples as shown in Table 1, Configuration II.

TABLE 1

| | Configuration I | Configuration II |
|---|---|---|
| | Example coatings on PEEK thermoplastic composites | |
| Topcoat | — | BMS10-60 Desothane ® White Thickness: 2~3 mil Curing: 14 days at 75 ± 10° F., 30-60% RH |
| Primer | DeSoto ® 512X310 Urethane Compatible Chrome-Free Epoxy Primer Thickness: 0.8~1.6 mil Curing: 7 days at 75 ± 10° F., 30-60% RH | DeSoto ® 512X310 Urethane Compatible Chrome-Free Epoxy Primer Thickness: 0.5~0.8 mil Curing: 2 hours at 75 ± 10° F., 30-60% RH |
| Adhesion Promoter | <5 μm | <5 μm |
| Substrate/Composite | Carbon Fiber reinforced PEEK, BMS8-422 | Carbon Fiber reinforced PEEK, BMS8-422 |

Two cross coats of BMS10-103 Gr A primer, as specified in Table 1, was applied to the composite panels to achieve a film thickness of approximately 0.5 to about 0.8 mil. The panels were dried for about 2 to about 2.5 hours at ambient prior to topcoat. The topcoat paint was sufficiently mixed prior to application. BMS10-60 Desothane topcoat (CA8000/B70846/CA8000B) was spray applied onto the composite panels to achieve a film thickness of 2 to 3 mils and cured for 14 days at 24±5° C., 30-60% RH prior to testing. For primer only coatings (configuration 1), the primer thickness is almost double the primer thickness used in configuration II (primer+topcoat coatings).

Peel strength test: Quantitative adhesion was assessed using Peel strength adhesion assessment based on ASTMD3330 and detailed in BSS7257. The minimum required adhesion for a pass is 20 pounds per inch wide peel strength with adhesion failure mode minimum 95% cohesive failure. The adhesion value and failure mode were recorded for each sample. Adhesion was measured after 14 days dry cure of the sealant ('dry adhesion') and after 7 days fluid immersion in jet fuel or 3% NaCl solution.

Scribe Adhesion: Scribe adhesion was conducted in general accordance with BOEING specification support standard BSS7225. Test specimens were scribed with a sharp blade to cut through the coating and into the base substrate to give 5 parallel scribes and repeated at a 45° angle to produce a crosshatch. The parallel scribes were 0.12" apart. Tape 250 (3M Co.) type masking tape was used, applied to the 450 intersection of the cross-hatch scribes and pressed down firmly using the tape roll. The tape was then removed in one quick but Smooth motion, perpendicular to the panel and examined for coating removal from the substrate and rated as outlined in the specification standard. A pass is considered for ratings of 8 or higher.

SIJA Adhesion Test: Adhesion testing was completed using a Single Impact Jet Apparatus (SIJA, Cambridge) roughly according to BSS 7391. The initial equipment was configured using a 1 mm nozzle and employed 0.22 calibre 5.5 mm Crosman Accupell Pointed Pellets (#11246). The nozzle-specimen distance was fixed at 7 mm. Testing was completed following immersion in water overnight, employing a line laser to locate the impact position and using a 45° specimen to impact droplet geometry. A single water jet was impacted at each site to test adhesion with the pressure employed for the "shot indicated below its impact. A 600 m/s target velocity was used for each individual shot. GIMP Software was used to assess the area removed. A passing score is considered to have a paint removal area of <5 mm²

Figure 4:
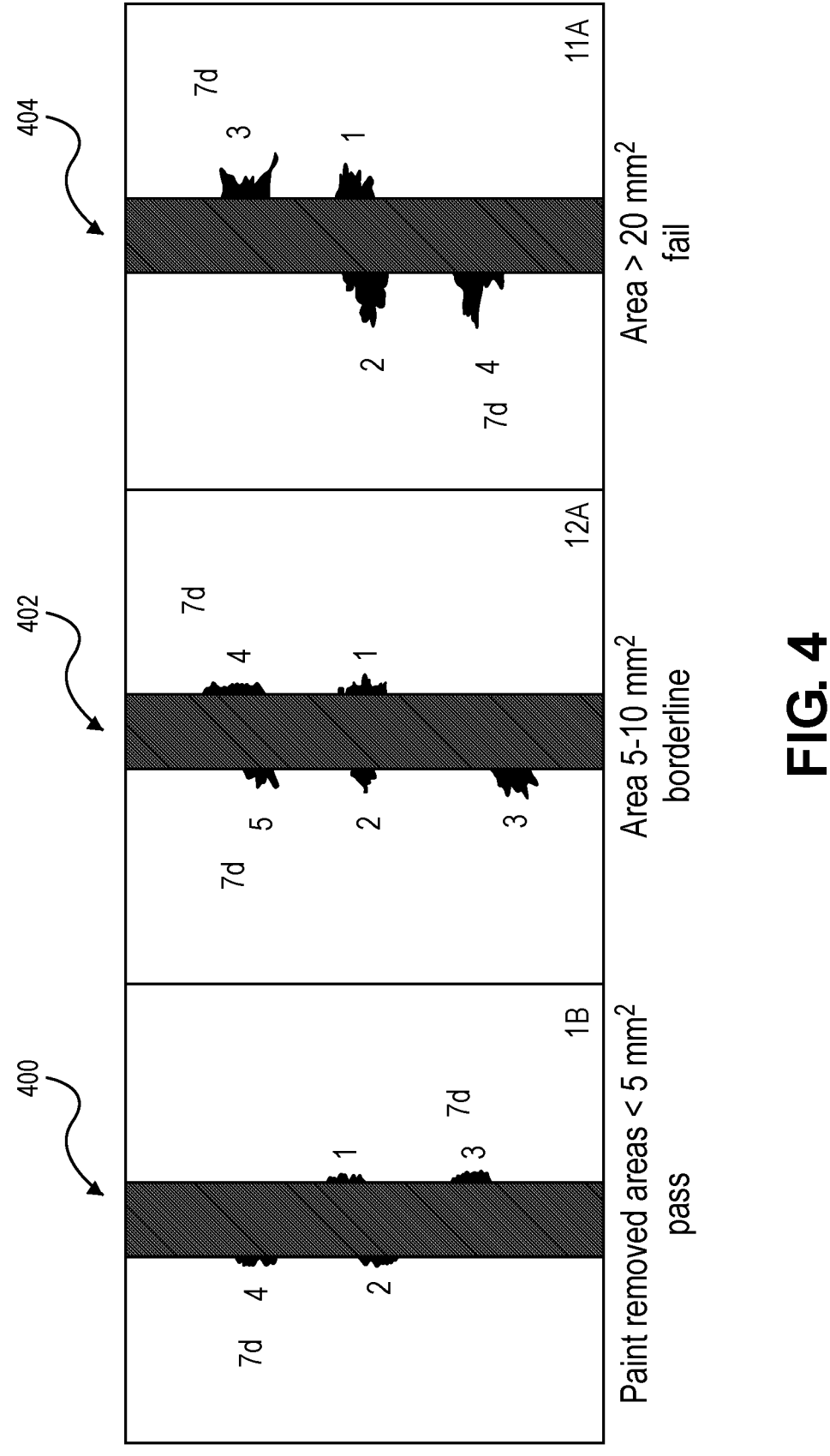
FIG. 4 is an image of painted and treated SIJA adhesion panels after adhesion testing.

FIG. 4 is a depiction of the results of an exemplary adhesion test, in accordance with the present disclosure. As briefly described above, the adhesion assessment was completed using a Single Impact Jet Apparatus (SIJA, Cambridge). The initial equipment was configured using a 1.0 mm nozzle and employed 0.22 calibre 5.5 mm Crosman Accupell Pointed Pellets (#11246). Testing was completed following immersion in water for minimum 20 hour employing a line laser to locate the impact position and using a 45° specimen to impact droplet geometry. A single water jet was employed at each site to test adhesion with the pressure employed for the "shot" indicated below its impact. The velocity of each individual shot was recorded for future reference, but generally the velocity was ~600 m/s (±25 m/s). GIMP Software was used to assess the area removed. A passing score is considered to have a paint removal area of <5 mm². Two methods of calculating the area were used. An exemplary passing result is shown in one image 400. A failing result is shown in image 404, while a borderline result (area 5-10 mm²) is shown in image 402.

Rain Erosion Test: Rain erosion testing was conducted in accordance with BOEING Specification Support Standard BSS7393. The leading edge of the composite foil for exposure to rain droplets was generated by taping 1.82±0.03 inches with PG-777 tape (3M Co.) from the lower edge of the foil after surface treatment and prior to the topcoat being applied. Post curing, the foils were soaked in water for 16-24 hours then loaded into a whirling arm chamber and spun at average velocity of 385 miles per hour exposed to simulated rain of 3-4 inches of rainfall per hour and 1-4 mm in droplet size for about 30 mins. Specimens were then removed and analysed.

Skydrol Hydraulic Fluid Testing: Treated and painted samples (150 mm×75 mm) were soaked at room temperature in either de-ionised water or Skydrol (Avial) hydraulic fluid for 30 days before scribe adhesion testing.

Results of various trials of adhesion promoter compositions are summarized in the following tables. Deviations or changes to any standard procedures will be described in reference to each table.

Example 1. In this example, sanded BMS8-422 was sprayed with treatment solutions containing amino silane or swelling agent only. Solvents used in these formulations included 20% DMM, 30% PnP, and 50% MIBK. After drying at room temperature for 30 minutes, the specimens were cured at 120° C. for 30 minutes. The primer and topcoat were sprayed onto the specimens as per method description above. It is noted that dry scribe adhesions are all better than sanded only (no adhesion promoter) sample. However, after 30 days condensation humidity at 49° C. the scribe adhesion results were <7 rating. These results indicate that silane or swelling agent used alone is not sufficient for adhesion improvement of coating surface finishes.

TABLE 2

Scribe adhesion performance of diffusion-interlocking adhesion
promoter formulations containing aminosilane or swelling agent only
applied over sanded BMS8-422 and coated with primer and topcoat.

| Treatment | Concentration (%) | Dry | 7 days in $H_2O$ | Condensing Humidity |
|---|---|---|---|---|
| Sand only | / | 5 | 3 | 3-4 |
| APS | 2.5 | 9 | 8 | 7 |
| | 3 | 9 | 8 | 4 |
| | 4 | 9 | 8 | 7 |
| | 5 | 8 | 8 | 2 |
| APMDES | 3 | 8 | 8 | 6 |
| CNO | 5 | 3-5 | 4 | 3 |
| BCPhO | 5 | 8 | 8 | 7 |

Example 2. The adhesion was tested on sanded BMS8-422 with mixture of CNO and amino silanes with different methoxy or ethoxy silyl groups. The molar ratio of amino silane to CNO was 1:1. Solvents used in these formulations included 20% DMM, 30% PnP, and 50% MIBK. The specimens were air dried for 30 minutes, then cured in 120° C. oven for half an hour. All formulations led to better scribe and SIJA adhesion results than sanding only, except 3-aminopropyldimethylethoxysilane, monoethoxy. The results indicated the importance of the presence of two or more alkoxy groups in the silane, and the combination of the swelling agent with the silane.

TABLE 3

Scribe and SIJA adhesion of diffusion-interlocking adhesion promoter
formulations containing a mixture of CNO and amino silanes.

| Treatment | | Coating System | | |
|---|---|---|---|---|
| | | Scribe Adhesion | | SIJA Adhesion |
| | Dry | 7 day in $H_2O$ | Condensing Humidity | 1 day in $H_2O$ |
| Sanding only | 5-6 | 3-4 | 4 | >25 mm$^2$ |
| Sanding + 3.5% APTMS—CNO (1:1), Trimethoxy | 8 | 8 | 7 | ≤5 mm$^2$ |
| Sanding + 3.5% APMDMS—CNO (1:1), Dimethoxy | 8-9 | 8 | 8 | ≤5 mm$^2$ |
| Sanding + 3.5% APS—CNO (1:1), Triethoxy | 8 | 8 | 7-8 | ≤5 mm$^2$ |
| Sanding + 3.5% APMDES—CNO(1:1), Diethoxy | 10 | 9 | 8-9 | ≤5 mm$^2$ |
| Sanding + 3.5% APDMES—CNO(1:1), Monoethoxy | 5 | 5 | 2 | >25 mm$^2$ |

Example 3. In the following example, sanded and unsanded BMS8-399 were sprayed with 3.5% APMDES/BCPhO with amino silane:swelling agent molar ratio of 0.5. Solvents used in these formulations included 20% DMM, 30% PnP, and 50% MIBK. The sprayed samples were dried for 30 minutes at room temperature, then cured for half an hour in oven at temperature of 100, 120 and 150° C. For sanded plus adhesion promoter samples, the adhesion passed at all temperatures. But for unsanded plus adhesion promoter conditions, poor condensing humidity scribe adhesion is observed at higher temperature of 150 C.

TABLE 4

Scribe and SIJA adhesion of diffusion-interlocking adhesion promoter formulation (3.5% AMPDES/BCPhO solution with ratio of AMPDES:BCPhO of 1:2) over sanded or unsanded BMS8-399 at different cure temperatures.

| BMS8-399 | | Scribe Adhesion | | | SIJA Adhesion |
|---|---|---|---|---|---|
| Sanding | Temperature | Dry | 7 day in H$_2$O | Condensing Humidity | 1 day in H$_2$O |
| Y | 100° C. | 10 | 8 | 9 | 5-10 mm$^2$ |
| Y | 120° C. | 10 | 9 | 9 | ≤5 mm$^2$ |

TABLE 4-continued

Scribe and SIJA adhesion of diffusion-interlocking adhesion promoter formulation (3.5% AMPDES/BCPhO solution with ratio of AMPDES:BCPhO of 1:2) over sanded or unsanded BMS8-399 at different cure temperatures.

| BMS8-399 | | Scribe Adhesion | | | SIJA Adhesion |
|---|---|---|---|---|---|
| Sanding | Temperature | Dry | 7 day in H$_2$O | Condensing Humidity | 1 day in H$_2$O |
| Y | 150° C. | 9 | 9 | 9 | <5 mm$^2$ |
| N | 100° C. | 10 | 10 | 10 | 5 to 10 mm$^2$ |
| N | 120° C. | 9 | 9 | 9 | ~5 mm$^2$ |
| N | 150° C. | 9 | 8 | 2 | ~5 mm$^2$ |

Example 4. In the examples summarized in Table 5, the adhesion promoter compositions based on 3.5% solutions were used, with reference to active ingredients (total silane and swelling agent). These examples were cured at 120° C. for 30 minutes. Solvents used in these formulations included 20% DMM, 30% PnP, and 50% MIBK, using a two pass treatment application. The results summarized in Table 5 suggest that a range of ratios of silane:swelling agent lead to sufficient adhesion improvement.

TABLE 5

Scribe and SIJA adhesion of diffusion-interlocking adhesion promoter formulations with varying ratio of silane:swelling agent

| BMS8-399 unsanded | | | | | | SIJA Adhesion (mm2) |
|---|---|---|---|---|---|---|
| Treatment Formulation | C (%) | Silane/ Swelling Agent | Dry | 7 day in H$_2$O | Condensing Humidity | 1 day in H$_2$O |
| APMDES/BCPhO | 3.5 | 1.0 | 8 | 9 | 9 | 5 to 10 |
| APMDES/BCPhO | 3.5 | 0.5 | 8 | 9 | 9 | ≤5 |
| APMDES/BCPhO | 3.5 | 0.375 | 10 | 10 | 9, 10 | ≤5 |
| APMDES/BCPhO | 3.5 | 0.30 | 10 | 10 | 10 | 2-10 |
| APMDES/BCPhO | 3.5 | 0.25 | 10 | 10 | 9 | 5-8 |
| APMDES/BCPhO | 3.5 | 0.2 | 10 | 9 | 9 | ≤5 |
| APMDES/BCPhO | 3.5 | 0.15 | 10 | 9 | 8, 9 | 4-6 |

Example 5. In the examples summarized in Table 6, the silane to swelling agent ratios for all compositions is 0.5:1 and all adhesion promoter formulations were cured at 120° C. for 30 minutes. Solvents used in these formulations included 20% DMM, 30% PnP, and 50% MIBK. The addition of silane APS (aminopropyltriethoxylsilane) to the APMDES/BCPhO formulation led to a slight improvement in condensing humidity adhesion rating. The ratio of APS to APMDES did not have a significant effect on adhesion results.

TABLE 6

Scribe and SIJA adhesion of diffusion-interlocking
adhesion promoter formulations with mixed silanes

| Treatment Formulation | [C] (%) | APS/ APMDES | Silanes/ Swelling | Dry | 7 day in $H_2O$ | Condensing Humidity | SIJA Adhesion 1 day in $H_2O$ |
|---|---|---|---|---|---|---|---|
| APS-APMDES | 5 | 0 | 0.5 | 9 | 9 | 8 | <5 |
| mixed silanes | 5 | 1:5 | 0.5 | 10 | 9 | 8, 9 | <5 |
| with BCPhO | 5 | 1:4 | 0.5 | 10 | 9 | 8, 9 | <5 |
| | 5 | 1:2 | 0.5 | 9 | 9 | 8, 9 | ~5 |
| | 5 | 1:1 | 0.5 | 9 | 9 | 8 | <5 |

Example 6. Table 7 includes examples of using aqueous primer (45GY005 Chrome-Free Water Reducible Epoxy Primer) and 3.5% APMDES/BCPhO adhesion promoter composition, as indicated. These examples were cured at 120° C. for 30 minutes. Solvents used in these formulations included 20% DMM, 30% PnP, and 50% MIBK. For adhesion promoter compositions indicated with an asterisk (*), 20% APS based on the amount of APMDES was added to the adhesion promoter composition. The treatments summarized in Table 7 provided good scribe and SIJA adhesion when aqueous primer used. The results of Table 7 demonstrated no appreciable difference between two or four passes (i.e. different thicknesses of adhesion promoter).

TABLE 7

Scribe and SIJA adhesion of 3.5% APMDES/BCPhO formulations
using with aqueous primer (45GY005 Chrome-Free Water
Reducible Epoxy Primer) as the surface finish.

| Sanding | C (%) | Silane/ Swelling Agent | Pass | Dry | 7 day in $H_2O$ | Condensing Humidity | SIJA Adhesion (mm²) 1 day in $H_2O$ 0° |
|---|---|---|---|---|---|---|---|
| Y | 3.5 | 0.5 | 2 | 10 | 10 | 8 | <5 |
| Y | 3.5 | 0.5 | 4 | 10 | 10 | 8, 9 | <5 |
| N | 3.5 | 0.5 | 2 | 10 | 8 | 8, 9 | <5 |
| N | 3.5 | 0.5 | 4 | 10 | 8, 9 | 8 | <5 |
| Y | 3.5 | 0.375 | 2 | 9 | 10 | 8 | <5 |
| Y | 3.5 | 0.375 | 4 | 10 | 8 | 8 | <5 |
| N | 3.5 | 0.375 | 2 | 9 | 7, 8 | 8, 9 | <5 |
| N | 3.5 | 0.375 | 4 | 10 | 9 | 8 | <5 |
| Y * | 3.5 | 0.5 | 2 | 10 | 8 | 8 | ~5 |
| N * | 3.5 | 0.5 | 2 | 10 | 8 | 8 | <5 |
| N | Control, 399 no sanding, no AP | | 2 | / | / | | >400 |
| Y | Control, 399 sanded, no AP | | 7 | 6 | 5, 6 | | >20 |

Example 7. In these examples in Table 8, glass fibre reinforced PEKK composite, BMS8-429, was used as substrate. Adhesion promoter solutions with different concentration, amino silane to swelling agent ratio and with/without APS (the amount of APS is 20% of APMDES) were sprayed onto the surface. After air drying for 30 minutes, the specimens were cured at 120 C oven for 30 minutes. Organic solvent primer, BMS10-103 Gr A and BMS10-60 Desothane topcoat (CA8000/B70846/CA8000B) were applied subsequently. After curing at room temperature for 2 weeks, scribe adhesion and SIJA were tested. All formulations led to improved adhesion, demonstrating that the adhesion promoter formulations lead to improved adhesion for glass fiber reinforced PEKK.

TABLE 8

Adhesion results of adhesion promoter formulations on glass fiber PEKK composite, BMS8-429

| | BMS8-429 | | | Scribe Adhesion | | | SIJA Adhesion (mm$^2$) |
| Sanding | C (%) | Silane/ Swelling Agent | APS | Dry | 7 day in H$_2$O | Condensing Humidity | 1 day in H$_2$O |
|---|---|---|---|---|---|---|---|
| Y | 3.5 | 0.375 | No | 10 | 10 | 10, 10 | <5 |
| Y | 3.5 | 0.375 | yes | 10 | 10 | 8, 9 | <5 |
| Y | 5 | 0.375 | No | 10 | 7, 8 | 9, 10 | ~5 |
| Y | 5 | 0.375 | yes | 9 | 9 | 8, 9 | <5 |
| Y | 3.5 | 0.5 | No | 10 | 9 | 10, 10 | <5 |
| Y | 3.5 | 0.5 | yes | 10 | 10 | 9, 9 | ~5 |

TABLE 8-continued

Adhesion results of adhesion promoter formulations on glass fiber PEKK composite, BMS8-429

| | BMS8-429 | | | Scribe Adhesion | | | SIJA Adhesion (mm$^2$) |
| Sanding | C (%) | Silane/ Swelling Agent | APS | Dry | 7 day in H$_2$O | Condensing Humidity | 1 day in H$_2$O |
|---|---|---|---|---|---|---|---|
| Y | 5 | 0.5 | No | 10 | 9, 10 | 10, 10 | <5 |
| Y | 5 | 0.5 | yes | 10 | 10 | 8, 9 | 3-7 |
| N | 3.5 | 0.375 | No | 10 | 10 | 10, 10 | 4-7 |
| N | 3.5 | 0.375 | yes | 10 | 10 | 9, 10 | <5 |
| N | 5 | 0.375 | No | 10 | 7, 8 | 9, 10 | ~5 |
| N | 5 | 0.375 | yes | 9 | 9 | 9, 9 | 3-8 |
| N | 3.5 | 0.5 | No | 10 | 9 | 10, 10 | 4-7 |
| N | 3.5 | 0.5 | yes | 10 | 10 | 10, 10 | <5 |
| N | 5 | 0.5 | No | 10 | 9, 10 | 9, 9 | <5 |
| N | 5 | 0.5 | yes | 10 | 10 | 9, 10 | <5) |
| Y | Sand only control | | | 7, 8 | 7 | 7, 7 | 3-8 |

Example 8. In the examples shown in Table 9, BMS8-399 flat panels and rain erosion foils were coated with various amino silanes and swelling agents with different concentrations and ratios and overcoated with either primer only or primer and topcoat. Solvents used in these formulations included 20% DMM, 30% PnP, and 50% MIBK. The results indicate that the selected treatment solutions resulted in improved scribe and SIJA, adhesion and also passed the rain erosion rating (8 or higher) for sanded and then treated and painted composites.

TABLE 9

Scribe and SIJA adhesion, and rain erosion results of selected adhesion promoter solutions

| Coating System | | | Scribe Adhesion | | | SIJA Adhesion | Rain erosion |
| Treatment | Sand | Topcoat | Dry | 7 day in H$_2$O | Condensing Humidity | 1 day in H$_2$O | rating |
|---|---|---|---|---|---|---|---|
| Sanding only | Y | Y | 7 | 7 | 6 | >20 mm$^2$ | 7 |
| Sanding only | Y | N | 8 | 8 | 8 | N/A | N/A |
| 5% APS/CNO (1:2) | Y | Y | 9 | 9 | 9 | ≤5 mm$^2$ | 8 |
| 5% APS/CNO (1:2) | Y | N | 9 | 9 | 9 | N/A | N/A |
| 3.5% APMDES/CNO (1:2) | Y | Y | 9 | 9 | 9 | 5-15 mm$^2$ | 8-9 |
| 3.5% APMDES/CNO (1:2) | Y | N | 9 | 9 | 8 | N/A | N/A |
| 5% APMDES/CNO (1:2) | Y | Y | 9 | 9 | 9 | 5-10 mm$^2$ | 8 |
| 5% APMDES/CNO (1:2) | Y | N | 9 | 8 | 8 | N/A | N/A |
| 3.5% APMDES/BCPhO (1:2) | Y | Y | 10 | 9 | 9 | ≤5 mm$^2$ | 7-8 |
| 3.5% APMDES/BCPhO (1:2) | Y | N | 9 | 9 | 9 | N/A | N/A |
| 5% APMDES/BCPhO (1:2) | Y | Y | 10 | 10 | 9 | ≤5 mm$^2$ | 8-9 |
| 5% APMDES/BCPhO (1:2) | Y | N | 9 | 8 | 9 | N/A | N/A |

Example 9. In the example with results in Table 10, the solid content for all adhesion promoter solutions was 5% with ratio of APMDES/BCPhO=0.375, but different solvent systems were used. The AP solutions were sprayed onto unsanded BMS-399 surface. After solvents dried at RT for 30 minutes, the AP layer was further cured in a 120° C. oven for 30 minutes. Then primer and topcoat were applied under typical conditions. The SIJA adhesion performance passed with area removed <5 mm$^2$. The scribe adhesion for dry and 7 days immersion in water was all over 8 and most of them were 10. But after 30 days condensation humidity test, single or double solvent systems failed with ratings of 5-7. The example also indicates that solvents other than MIBK and PnP also work, particularly in solvent combinations.

TABLE 10

| Scribe and SIJA adhesion of adhesion promoter formulations based on 5% with ratio of APMDES/BCPhO = 0.375 but different carrier solvents | | | | |
|---|---|---|---|---|
| | | Scribe Adhesion | | |
| BMS8-399 unsanded Solvent mix | Dry | 7 day in H$_2$O | Condensing Humidity | SIJA Adhesion (mm$^2$) 1 day in H$_2$O |
| MPA only | 10 | 8 | 7 | <5 |
| DMM only | 10 | 8 | 5 | <5 |
| 50% MPA—50% DMM | 9 | 8 | 6 | <5 |
| 50% MIBK—30% PnP—20% DMM | 10 | 10 | 9 | <5 |
| 50% MAK—30% MPA—20% DMM | 10 | 10 | 8 | <5 |
| 30% BA—40% PA—30% DMM | 10 | 10 | 9 | ~5 |

Example 10: In these examples in Table 11, 5% APS-CNO or APS-CPO solution with silane to swelling agent ratio of 1:1 in mixed solvents was sprayed onto BMS8-422 surface. After drying in air for 60 minutes., the samples were cured at 120° C. for 30 minutes. After applying PR-1776M class B low weight fuel tank sealant, the assembly was cured at RT for 14 days. There is no adhesion at all between sealant and PEEK BMS8-422 when no adhesion promoter applied for both sanded and unsanded specimen. After application of adhesion promoter and thermal cure, the adhesion between sealant and PEEK increased significantly (resulted in failure inside sealant rather than between sealant and composite). All samples with adhesion promoting solution treatment also passed 7 days salt and jet fuel immersion at 160° F.

TABLE 11

| Peel adhesion results of sealant on BMS8-422 after adhesion promoter application and effects of immersion in salt solution and jet fuel. | | | | | | | |
|---|---|---|---|---|---|---|---|
| | | Dry Adhesion | | 7 Days 3% NaCL immersion at 160 F. | | 7 Days Jet Fuel immersion at 160 F. | |
| Chemical | Sand | lb/inch | Mode | lb/inch | Mode | lb/inch | Mode |
| No | N | 1.1 | 100% AF | / | / | / | / |
| No | Y | 3.7 | 100% AF | / | / | / | / |
| APS-CNO | N | 23 | 100% CF | 26.9 | 100% CF | 30.5 | 100% CF |
| APS-CNO | Y | 31.2 | 100% CF | 33.4 | 100% CF | 31.3 | 100% CF |
| APS-CPO | N | 24.7 | 100% CF | 25.0 | 100% CF | 26.8 | 100% CF |

Note:
AF: adhesive failure;
CF: cohesive failure

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or examples of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other examples of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. An adhesion promoter composition, comprising:
one or more reactive silanes having a general formula $((RO)n-SiY)m-(CH2)x-A$, where n=2-3, m=1-2, and Y does not exist (when n=3) or is a C1-C6 alkyl group, x=1-8, A=None, NH$_2$, SH, or epoxy, z=1-2 and R═C1-C6 alkyl;
one or more swelling agents; and
one or more organic solvents;
   wherein the one or more reactive silanes forms a complex with the one or more swelling agents through hydrogen bonding and/or ionic bonding;
   wherein the one or more swelling agents comprises a phenol or naphthol derivative; and
   wherein the one or more organic solvents is amide-free.

2. The adhesion promoter composition of claim 1, wherein a molar ratio of the one or more reactive silanes to the one or more swelling agents is from about 0.1:1 to about 1.5:1.

3. The adhesion promoter composition of claim 1, wherein the one or more reactive silanes comprises an amine functional group, an epoxy functional group, a mercapto functional group, an isocyanate functional group, or a combination thereof.

4. The adhesion promoter composition of claim 1, wherein the one or more reactive silanes comprises a trialkoxy silane, such as trimethoxy, triethoxy, tripropoxy, etc., or a dialkoxy silane, such as dimethoxy, diethoxy, dipropoxy, monoalkoxy silane, such as dimethylmethoxy, dimethylethoxy, diethylmethoxy, diethylethoxy, or a combination thereof.

5. The adhesion promoter composition of claim 1, wherein the one or more reactive silanes comprises a multialkoxy silane.

6. The adhesion promoter composition of claim 5, wherein the one or more reactive silanes comprises a bis-trimethoxysilane, a bis-triethoxysilane, a tris-trimethoxysilane, a tris-triethoxysilane, or a combination thereof.

7. The adhesion promoter composition of claim 1, wherein the one or more reactive silanes is selected from a group consisting of 3-aminopropyltrimethoxysilane (APTMS), 3-aminopropyltriethoxysilane (APS), 3-aminopropylmethyldimethoxysilane (APMDMS), 3-aminopropylmethyldiethoxysilane (APMDES), 3-aminopropyldimethylethoxysilane (APDMES), 3-(2-aminoethylamino)propyltrimethoxysilane (AEPTMS), 3-(2-aminoethylamino)propyltriethoxysilane (AEPTES), 3-(2-Aminoethylamino)propyldimethoxymethylsilane (AEDMMS), 3-(2-Aminoethylamino)propyldiethoxymethylsilane (AEDMES), 3-[2-(2-Aminoethylamino)ethylamino]propyltrimethoxysilane (TMSDETA), and 3-[2-(2-Aminoethylamino)ethylamino]propyltriethoxysilane (TESDETA).

8. The adhesion promoter composition of claim 1, wherein the one or more reactive silanes is selected from a group consisting of bis[3-(trimethoxysilyl)propyl]amine (BTMSPA), 1,2-bis(trimethoxysilyl)ethane (BTMSE), 1,8-bis(trimethoxysilyl)octane (BTMSO), tris[3-(trimethoxysilyl)propyl]isocyanurate (TMSIC), 1,2-bis(triethoxysilyl)ethane (BTESE), 1,8-bis(triethoxysilyl)octane (BTESO), and bis[3-(triethoxysilyl)propyl]tetrasulfide (BTSTS).

9. The adhesion promoter composition of claim 1, wherein the one or more reactive silanes comprises (3-glycidyloxypropyl)trimethoxysilane (GPTMS), (3-glycidyloxypropyl)triethoxysilane (GPTES), [2-(3,4-epoxycyclohexyl)ethyl]trimethoxysilane (ECTMS), [2-(3,4-epoxycyclohexyl)ethyl]triethoxysilane (ECTES), (3-mercaptopropyl)trimethoxysilane (MPTMS), (3-mercaptopropyl)triethoxysilane (MPTES), 3-(trimethoxysilyl)propyl isocyanate (TMSPI) and 3-(Triethoxysilyl)propyl isocyanate (TESPI), or a combination thereof.

10. The adhesion promoter composition of claim 1, wherein the one or more reactive silanes is present in the adhesion promoter composition in an amount of from 1 wt % to 10 wt % based on a total weight of the adhesion promoter composition.

11. The adhesion promoter composition of claim 1, wherein the one or more swelling agents is present in the adhesion promoter composition in an amount of from 1 wt % to 10 wt % based on a total weight of the adhesion promoter composition.

12. The adhesion promoter composition of claim 1, wherein the one or more swelling agents is selected from a group consisting of chloro substituted phenol or naphthol derivatives, such as 2-chlorophenol (2CPO), 3-chlorophenol (3CPO), 4-chlorophenol (CPhO), 2-amino-4-chlorophenol (ACPO), 2-allyl-4-chlorophenol (AlCPO), 2-benzyl-4-chlorophenol (BCPO), 2-methoxy-4-chlorophenol (MCPO), 4-chloro-1-naphthol (CNO), 2-chloro-1-naphthol (2CNO), 1-chloro-2-naphthol (C2NO), 2,4-dichloro-1-naphthol (DCNO), 2-allyl-4-chloro-1-naphthol (ACNO), and 3,3'-dichloro-[1,1'-binaphthalene]-2,2'-diol, 2,2'-methylenebis (4-chlorophenol) (BCPhO), 4,4'-isopropylidenebis(o-chlorophenol), and 2,6-Bis(2-hydroxy-5-chlorobenzyl)-4-chlorophenol.

13. The adhesion promoter composition of claim 1, wherein the one or more organic solvents comprises alcohols, ethers, esters, ketone, such as isopropanol, butyl alcohol, di(propylene glycol) momomethyl ether (DPM), dipropylene glycol dimethyl ether (DMM), propylene glycol monopropyl ether (PnP), dimethyl isosorbide, propylene glycol monomethylether acetate (MPA), butyl acetate, t-butyl acetate, pentyl acetate, ethylene glycol diacetate, propylene glycol diacetate, methyl isobutyl ketone (MIBK), methyl amyl ketone (MAK), or a combination thereof.

14. An adhesion promoter composition, comprising:

one or more reactive silanes having a general formula $((RO)n-SiY)m-(CH2)x-A$, where n=2-3, m=1-2, and Y does not exist (when n=3) or is a C1-C6 alkyl group, x=1-8, A=None, NHz, SH, or epoxy, z=1-2 and R=C1-C6 alkyl;

one or more swelling agents; and one or more organic solvents; and wherein:

the one or more reactive silanes forms a complex with the one or more swelling agents through hydrogen bonding and/or ionic bonding;

a molar ratio of the one or more reactive silanes to the one or more swelling agents is from about 0.1:1 to about 1.5:1 the one or more swelling agents comprises a phenol or naphthol derivative; and wherein the one or more organic solvents is amide-free.

15. The adhesion promoter composition of claim 1, wherein the one or more reactive silanes comprises a trialkoxy silane.

16. The adhesion promoter composition of claim 1, wherein the one or more reactive silanes comprises 3-aminopropyltrimethoxysilane (APTMS).

17. The adhesion promoter composition of claim 1, wherein the one or more reactive silanes comprises 3-aminopropyltriethoxysilane (APS).

18. The adhesion promoter composition of claim 1, wherein the one or more reactive silanes comprises bis [3-(trimethoxysilyl) propyl] amine (BTMSPA).

19. The adhesion promoter composition of claim 1, wherein the one or more reactive silanes comprises (3-glycidyloxypropyl) trimethoxysilane (GPTMS).

20. The adhesion promoter composition of claim 1, wherein the one or more swelling agents comprises 2-chlorophenol (2CPO).

21. The adhesion promoter composition of claim 1, wherein the one or more swelling agents comprises 3,3'-dichloro-[1,1'-binaphthalene]-2,2'-diol.

* * * * *